June 13, 1933.   C. P. SCHLEGEL   1,914,217
MOLDING
Filed Feb. 29, 1932   2 Sheets-Sheet 1
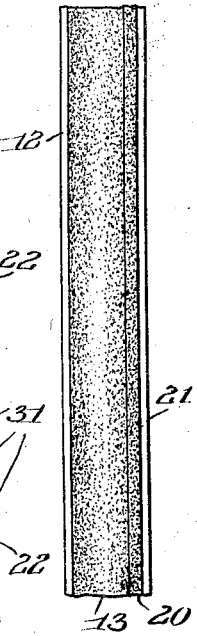
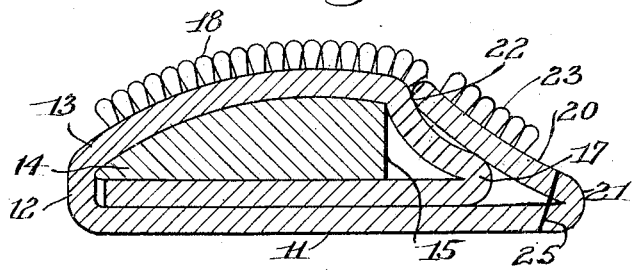
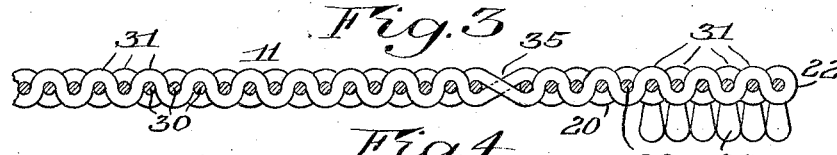
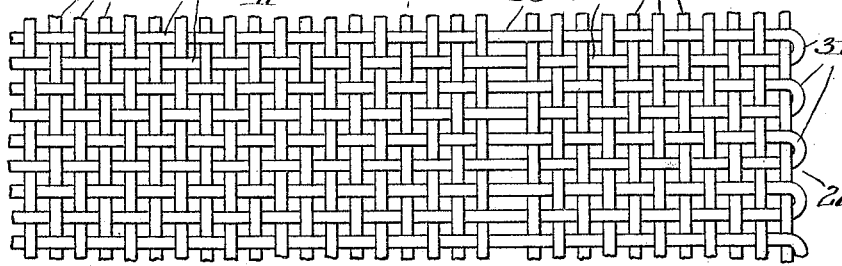
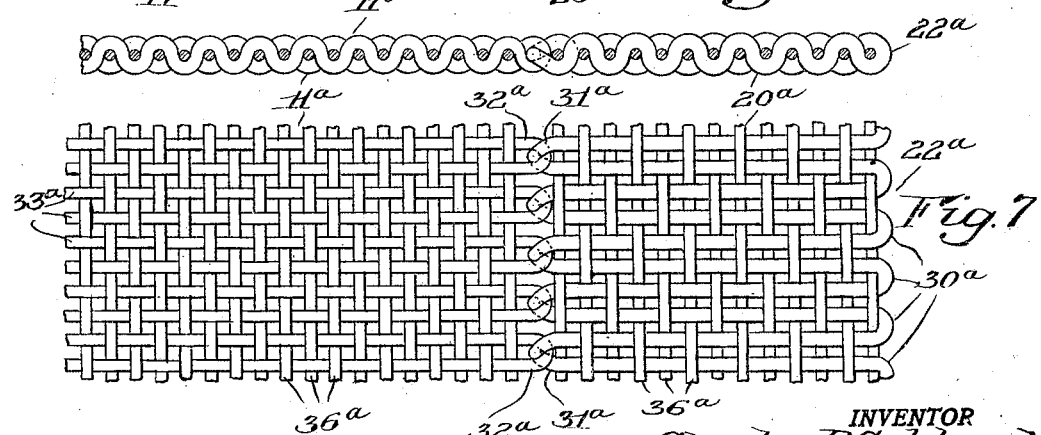
INVENTOR
Charles P. Schlegel
BY Edward H. Cumpston
his ATTORNEY June 13, 1933.  C. P. SCHLEGEL  1,914,217
MOLDING
Filed Feb. 29, 1932  2 Sheets-Sheet 2
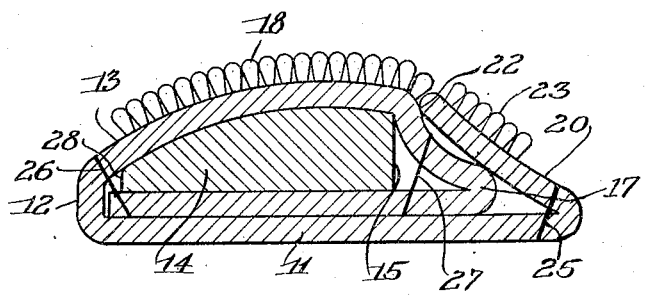
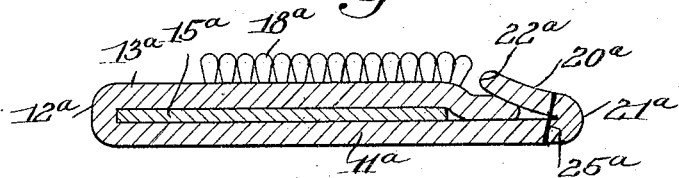
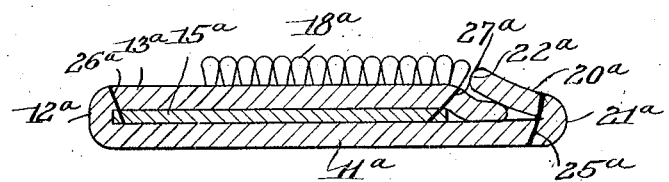
INVENTOR
Charles P. Schlegel
BY Edward H. Cumpston
his ATTORNEY Patented June 13, 1933                                                                                    1,914,217

UNITED STATES PATENT OFFICE

CHARLES P. SCHLEGEL, OF ROCHESTER, NEW YORK, ASSIGNOR TO THE SCHLEGEL MANUFACTURING COMPANY, OF ROCHESTER, NEW YORK, A CORPORATION OF NEW YORK

MOLDING

Application filed February 29, 1932. Serial No. 595,684.

The present invention relates to molding strips for trimming and finishing upholstery such, for example, as in automobile bodies, and more particularly to the blind nail variety of molding in which a locking portion of the strip is arranged to releasably secure a cover piece in position to conceal the securing means. One object of the invention is the provision of a molding of the class described having a substantially smooth, unbroken, and ornamental surface design.

Another object is the provision of a molding of this character which is pleasing and simple in appearance and capable of holding the shape and arrangement of its parts, and at the same time of simple and inexpensive construction.

A further object is the provision in such a molding of more efficient and economical means for affording the desired stiffness and permanency of form together with an improved woven construction facilitating the shaping and arranging of the parts in application to the upholstering.

To these and other ends the invention resides in certain improvements and combinations of parts, all as will be hereinafter more fully described, the novel features being pointed out in the claims at the end of the specification.

In the drawings:

Fig. 1 is a plan view of a molding constructed in accordance with one embodiment of the invention;

Fig. 2 is a vertical sectional view taken transversely of the molding illustrated in Fig. 1 on a larger scale, showing the relation of the various parts of the molding;

Fig. 3 is an enlarged fragmentary vertical sectional view of the strip from which the molding illustrated in Fig. 2 is formed, showing the method of securing the weakened section between adjacent portions of the strip;

Fig. 4 is a plan view of a strip illustrated in Fig. 3;

Fig. 5 is a vertical sectional view taken transversely of another embodiment;

Fig. 6 is an enlarged fragmentary vertical sectional view of the strip from which the molding in Fig. 5 is formed, showing another method of forming the weakened section;

Fig. 7 is a plan view of the strip illustrated in Fig. 6;

Fig. 8 is a view similar to Fig. 2 showing another method of securing the core in the cover piece;

Fig. 9 is a view similar to Fig. 5 but differing therefrom in that the nail receiving portion is not provided with a stiffening and supporting member, and Fig. 10 is a view similar to Fig. 9 showing another method of securing the cover stiffening and supporting member in place.

The same reference numerals throughout the several views indicate the same parts.

The present invention is embodied, in the present instance by way of illustration, in an upholstering molding of the blind nail type formed from a strip of flexible material such, for example, as textile fabric, and arranged to provide a nail receiving portion, a cover piece or portion adapted to overlie the nail receiving portion to conceal the retaining means, and a locking member for removably securing the cover piece in position over the nail receiving portion. The fabric is provided with an improved woven construction which facilitates the folding of parts of the strip to provide the cover piece and the locking member, hereafter more fully described.

Referring to the drawings, Fig. 2 shows a molding of the blind nail type formed from a single strip of textile fabric having an intermediate portion 11 adapted to receive fastening means. One side of the strip is reversely bent along the line 12 to provide a cover piece 13 hingedly secured along the line 12 to the portion 11, and adapted to be moved to and from position to cover or conceal the fastening means. This cover piece is preferably provided with a core 14 of paper, rubber, or other suitable material formed to provide a shoulder 15, adjacent the free edge of the cover piece, as clearly illustrated in Fig. 2. The fabric strip is wrapped around and preferably adhesively secured to the core, and has a portion extending over the shoulder 15 and folded upon itself as at 17 to provide a reduced marginal edge which is arranged to be tucked under a locking member, hereafter described, to releasably secure the cover piece in closed position. A cut or uncut pile surface 18 may be provided on the whole or part of the cover piece 13, leaving the edge 17 free from pile as shown.

In order to securely retain the cover piece 13 in position over the portion 11, the present invention provides a greatly simplified cover holding member which preferably comprises a thin, flat locking fold or member 20 of single thickness, formed by reversely bending, along the line 21, the edge of the strip opposite to that from which the cover piece is formed. The free edge of this locking member provides a locking lip 22 beneath which the marginal edge 17 of the cover piece is adapted to be tucked, the cover piece 13 and nail receiving portion 11 being slightly elastic to allow the cover piece to be positioned under the lip. When the cover piece is in closed position, as illustrated in Fig. 2, the locking member 20 overlies the edge 17 while the lip 22 engages the cover piece to releasably secure the cover piece in position over the portion 11. A cut or uncut pile surface 23 may be provided on the locking member 20, if desired.

While the locking member may be made substantially stiff to retain the cover piece in position, it is preferred to provide auxiliary supporting and stiffening means preferably in the form of a row of stitching 25 extending through the portion 11 and the member 20 adjacent the fold 21, as clearly illustrated in Fig. 2. This row of stitching provides means for supporting and stiffening the inturned lip 22 beneath which the edge 17 of the cover piece is adapted to be tucked.

When a molding of the class above described is used in connection with the trim, it is desirable to have the surface of the molding substantially smooth and unbroken so as to eliminate creases which will catch dirt and to permit a continuous surface design to be used from edge to edge of the molding. Referring to Fig. 2, it is seen that when the locking member 20 overlies the edge 17, the lip 22 engages the cover piece adjacent the pile 18 and is held slightly elevated thereby so that the pile surface 23 of the locking member forms a substantial continuation of the pile surface 18 of the cover piece. This construction thus provides a molding having a substantially smooth unbroken contour, the pile 18 overlapping the lip 22 to close up the joint formed between the cover piece and the locking member.

The present invention also provides an improved woven construction which facilitates the shaping and arranging of the molding parts. Referring to Figs. 3 and 4 there is shown an enlarged section of the textile strip from which the molding illustrated in Figs. 1 and 2 is formed. This strip is made up of a plurality of warp strands 30 and a plurality of weft strands 31. The warp strands are equally spaced over the greater portion of the strip, as shown in Figs. 3 and 4, but at certain predetermined points in the strip one or more of the warp strands are omitted so that the warp strands at this point are spaced a distance greater than that between the other warp strands to produce a weakened section 35, as clearly illustrated in Fig. 4. Such a construction provides means which enables the reversely bent parts of the strip to be easily and quickly folded to form the cover piece and the locking member. While only one such weakened section is shown, it is to be understood that this construction is adapted to be used at any point where the strip is to be folded, such as for example on the lines 12 and 21, and the fold which forms the edge 17.

The above described arrangement provides an effective means for holding the cover piece of the strip in closed position while, at the same time, furnishing a molding having a substantially uniform contour in cross section. To secure the necessary stiffness, the strip may be woven of sufficient thickness or of a stiff coarse material and/or coated with a suitable stiffening solution, which may be applied only to the portion 11 or to the entire strip as desired.

Figs. 5 to 7 show a modified form of molding comprising a strip of textile material similar to that used in the molding illustrated in Fig. 2 and having a nail receiving portion 11a. One edge of the strip is folded or reversely bent on the line 12a to provide a flat cover piece 13a adapted to overlie the portion 11a, as clearly illustrated in Fig. 5. The portion 11a is preferably stiffened and given more body by adhesively or otherwise securing thereto a stiffening fabric 14a, such for example as buckram, which preferably extends substantially the full width of the portion 11a, and the cover piece 13a is also preferably stiffened by adhesively or otherwise securing thereto a stiffening fabric 15a, such for example as oilcloth. The fabric 15a is preferably terminated short of the free end of the cover piece 13a to provide a longitudinally extending marginal edge 17a adapted to be tucked under a locking member, as clearly illustrated in Fig. 5 and hereafter more fully described. A pile surface 18a may be provided on all or part of the cover piece 13a, leaving the edge 17a free of pile as shown.

The cover piece is held in closed position by a locking member 20a of single thickness formed by reversely bending, along the line 21a, the edge of the strip opposite to that from which the cover piece is formed. The free edge of the member 20a provides a locking lip 22a beneath which the edge 17a of the cover piece is arranged to be tucked and held against the member 14a, the lip 22a engaging the pile 18a, as clearly illustrated in Fig. 5. A row of stitching 25a extends through the portion 11a and the locking member 20a adjacent the fold 21a to provide stiffening and supporting means for the lip 22a.

While the nail receiving portion 11a and the cover piece 13a has been shown with suitable auxiliary stiffening means, this is by way of illustration only as it is understood that the portion 11a and/or the cover piece 13a may be made stiff enough by constructing these sections of the strip of substantially stiff material. It is desirable, however, that the locking member 20a be stiffened in order to securely hold the cover piece under it, and this may be accomplished by providing the locking member with stiff weft strands 30a of wire, coarse rayon or other similar coarse stiff material. These weft strands are arranged in the manner shown in Fig. 7 and are preferably provided with loops 31a at their ends which engage complementary loops 32a of the smaller fibrous strands 33a of the portion 11a, as clearly illustrated in Fig. 7. These loop connections are disposed along the line 21a and provide means which facilitate the bending of the strip to form the locking member, the connection along the line 12a being formed as shown at 35, Fig. 4. Referring to Fig. 7, it will be seen that the warp strands 36a, adjacent the loops 31a and 32a, are spaced a distance greater than that between other adjacent warp strands, thus further weakening the portion of the strip adjacent the loops and enabling the locking member to be easily and quickly folded over the intermediate portion.

With such a texture, the row of stitching 25a through the portion 11a and the locking member 20a supports the latter so as to form a stiff locking lip 22a under which the cover piece may be secured, the portion 11a and the cover piece 13a being sufficiently elastic to permit the latter to be somewhat contracted for tucking it under the locking member, after which the cover piece expands under the locking member and is held in place thereby. This construction provides a substantially thin flat molding which is highly desirable and in which the cover piece and the locking member lie substantially in the same plane.

Fig. 8 shows a molding similar to that illustrated in Fig. 2 and differing therefrom only in the manner of securing the core in position in the cover piece, the corresponding parts in the two figures being designated by the same reference numerals. In this embodiment the core 14 is retained in place in the cover piece by rows of stitching 26 and 27 adjacent the edges of the cover piece and extending through the upper and lower fabric portions thereof, as clearly illustrated in Fig. 8. The core is preferably cut away as at 28 to facilitate the stitching of the cover piece adjacent the hinge connection 12.

In some instances, it may be desirable to use a molding which is of a flatter construction than that illustrated in Fig. 5. To secure this result the present invention provides another form of molding, illustrated in Fig. 9, which is identical to that shown in Fig. 5, except that no stiffening and supporting means is provided for the nail receiving portion 11a. By eliminating this stiffening member, the portion 11a, Fig. 9, is more flexible and a flatter molding is provided.

While the member 15a, Figs. 5 and 9, is shown and described as being adhesively secured to the underside of the cover piece 13a, it is contemplated that other securing means may be provided such, for example, as rows of stitching 26a and 27a. These rows of stitching extend through the cover piece and the member 15a to securely retain the latter in position on the underside of the cover piece, as clearly illustrated in Fig. 10. The stitching may be used in addition to or in place of an adhesive material to retain the member 15a in position. As the moldings illustrated in Figs. 5, 9, and 10 are similar with the exception of the slight differences pointed out above, corresponding parts in these three figures are designated by the same reference numerals.

It is apparent from the above description that the locking lip is woven sufficiently stiff in the loom so that when it is sewed down, as at 25 and 25a, to the nail receiving portion 11, it is complete in form for holding the cover portion without the use of cores or fillers. This is accomplished, as described, by weaving the strip, or at least that portion of the strip which forms the locking lip, with relative stiff fibers, particularly the weft or cross strands. This simple and self contained locking lip structure is adapted to engage over and to cooperate effectively with the reduced marginal portion of the cover to releasably secure the latter in closed position.

The moldings above described are not only simpler in construction, and more economical to manufacture than prior forms of molding, but they can be shipped on reels without danger of crushing the locking lip.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. An upholstering molding comprising a fabric strip having an intermediate portion arranged to receive fastening means, one side of said strip being reversely bent to form a cover portion hingedly secured to one side of said intermediate portion, stiffening and supporting means for certain of said portions, the other side of said strip being reversely bent to form a flat narrow locking member the free edge of which provides a locking lip beneath which a part of the cover piece is arranged to be tucked to releasably secure the cover piece in closed position, said member having weft strands of stiff or coarse material to provide stiffening means therefor, and a row of stitching extending through said intermediate portion and said locking member to support and stiffen said locking lip.

2. An upholstering molding comprising a fabric strip having an intermediate portion arranged to receive fastening means, one side of said strip being reversely bent to form a cover portion hingedly secured to one side of said intermediate portion, stiffening and supporting means for certain of said portions, the other side of said strip being reversely bent to form a flat narrow locking member the free edge of which provides a locking lip beneath which a part of the cover piece is arranged to be tucked to releasably secure the cover piece in closed position, said locking member being formed with weft strands of stiff or coarse material to provide stiffening means therefor, said weft strands being looped at their ends through the weft strands of the intermediate portion to form at said loops a weakened section which permits said locking member to be reversely bent, and a row of stitching extending through said intermediate portion and said locking member to support and stiffen the locking lip.

3. An upholstering molding comprising a fabric strip having an intermediate portion arranged to receive fastening means, one side of said strip being reversely bent to form a cover piece hingedly secured to said intermediate portion, stiffening and supporting means for said portion and said cover piece, said cover piece being formed to provide a marginal edge of reduced thickness, the other side of said strip being reversely bent to form a thin flat locking member the free edge of which is arranged to overlie said reduced marginal edge to hold said cover piece in closed position, said cover piece and said locking member forming a molding having a substantially smooth unbroken surface, said locking member having weft strands of stiff or coarse material looped to the weft strands of the intermediate portion and forming at said loops a weakened section which permits said locking member to be reversely bent, and a row of stitching extending through said portion and said locking member to support and stiffen the locking lip.

4. An upholstering molding comprising a fabric strip having an intermediate portion arranged to receive fastening means, one side of said strip being reversely bent to form a cover portion hingedly secured to one side of said intermediate portion, stiffening and supporting means for said cover piece, rows of stitching extending through said cover piece to secure said stiffening and supporting means thereto, the other side of said strip being reversely bent to form a flat locking member, the free edge of which provides a locking lip beneath which a part of the cover piece is arranged to be tucked to releasably secure the cover piece in closed position, said member having weft strands of stiff or coarse material to provide stiffening means therefor, and a row of stitching extending through said intermediate portion and said locking member to support and stiffen the locking lip.

5. An upholstery molding comprising a strip of flexible material having an intermediate portion for receiving the means for fastening said molding in place, a marginal portion at one side of said intermediate portion folded to extend over and cover said intermediate portion and said fastening means, another marginal portion at the other side of said intermediate portion integrally formed of inherently flexible but stiff material to provide a relatively flat, narrow, locking member adapted to be folded over and to hold the adjacent edge of said cover portion in covering position, said locking member and said cover portion being arranged to afford a substantially smooth and unbroken outer surface for the molding, and means for attaching said locking member to said intermediate portion inwardly of the line of fold therebetween for further stiffening and supporting said locking member in locking position.

6. An upholstery molding comprising a strip of woven fabric having an intermediate portion for receiving the means for fastening said molding in place, a marginal portion at one side of said intermediate portion folded to extend over and cover said intermediate portion and said fastening means, another marginal portion at the other side of said intermediate portion having relatively stiff strands woven therein to provide an inherently flexible but stiff portion serving as a relatively flat, narrow, locking member adapted to be folded over and to hold the adjacent edge of said cover portion in covering position, said locking member and said cover portion affording a substantially smooth and unbroken outer surface for said molding, and means for attaching said locking member to said intermediate portion inwardly of the line of fold therebetween for further stiffening and supporting said locking member in locking position.

7. An upholstery molding comprising a strip of flexible material having an intermediate portion for receiving the means for fastening said molding in place, a marginal portion at one side of said intermediate portion folded to extend over and cover said intermediate portion and said fastening means, another marginal portion at the other side of said intermediate portion formed integrally of a single ply of inherently flexible but stiff material to provide a relatively flat, narrow, locking member adapted to be folded over and to hold the adjacent edge of said cover portion, said locking member and said cover portion cooperating in shape to afford a substantially smooth and unbroken outer surface for the molding, and stitching attaching said locking member to said intermediate portion inwardly of the line of fold therebetween for further stiffening and supporting said locking member in locking position.

8. An upholstery molding comprising a woven fabric strip having an intermediate portion for receiving the means for fastening said molding in place, a marginal portion at one side of said intermediate portion folded to extend over and cover said intermediate portion and said fastening means, a relatively thin, flat strip of stiffening material secured to the under surface of said cover portion, another marginal portion at the other side of said intermediate portion having relatively stiff strands woven therein to provide an inherently flexible but stiff portion serving as a relatively flat, narrow, locking member adapted to be folded over and to hold the adjacent edge of said cover portion in covering position, said locking member and said cover portion cooperating in shape to afford a substantially smooth and unbroken outer surface for the molding, and stitching attaching said locking member to said intermediate portion inwardly of the line of fold therebetween for further stiffening and supporting said locking member in locking position.

CHARLES P. SCHLEGEL.